Feb. 7, 1928.
L. O. RAMSDELL
1,658,351
MEASURING MACHINE
Filed March 5, 1927   2 Sheets-Sheet 1
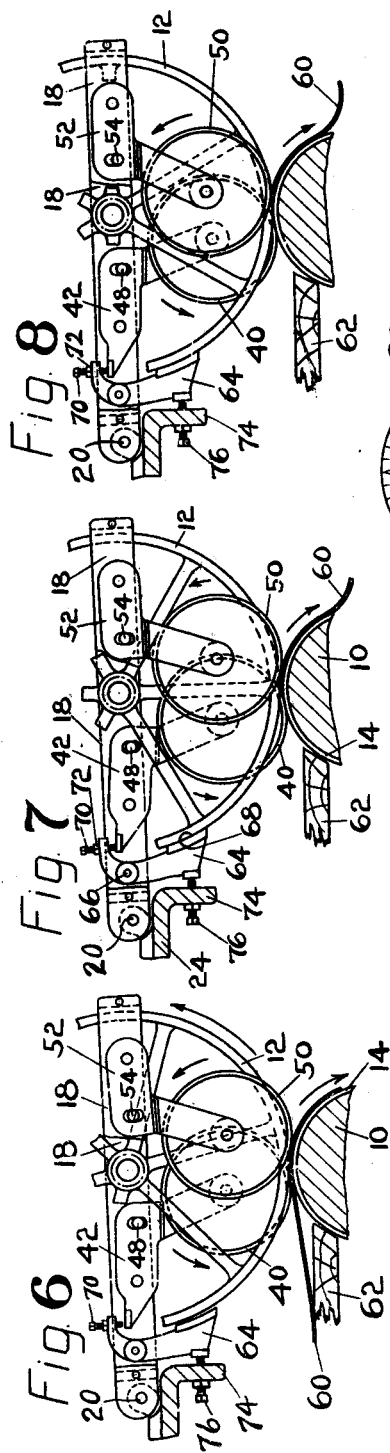
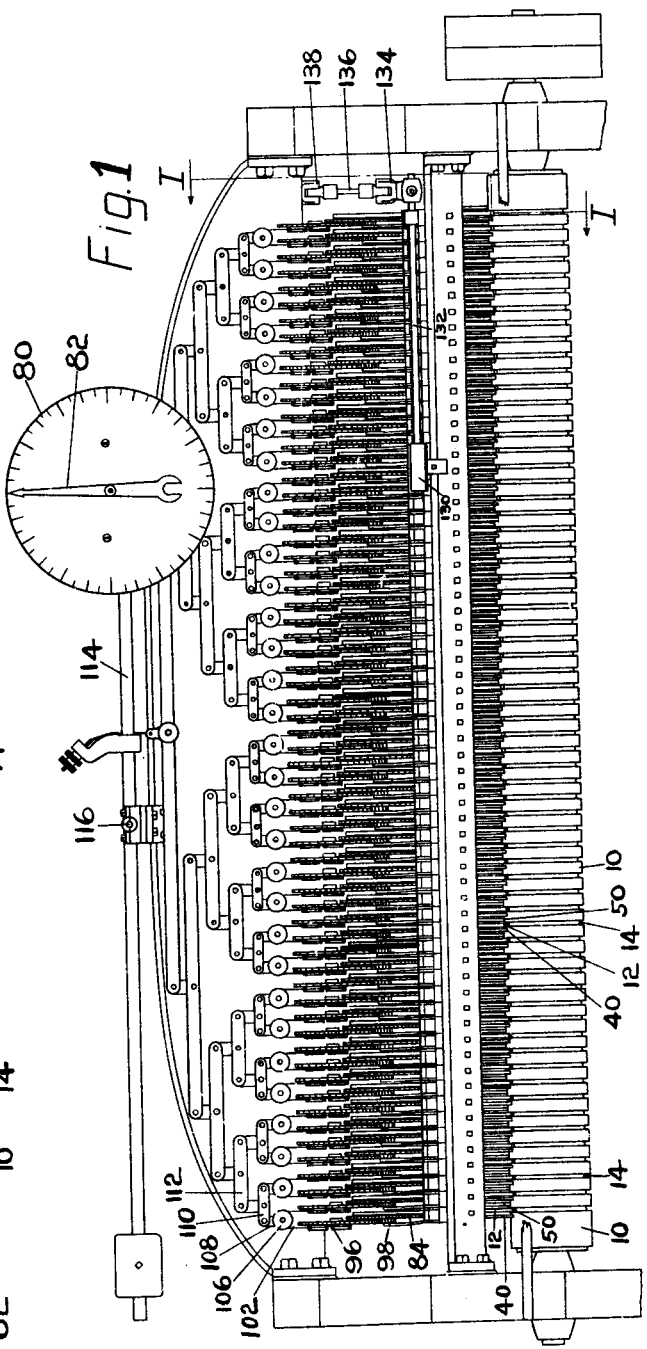
Inventor
Lyndon Oak Ramsdell Feb. 7, 1928.
L. O. RAMSDELL
1,658,351
MEASURING MACHINE
Filed March 5, 1927  2 Sheets-Sheet 2
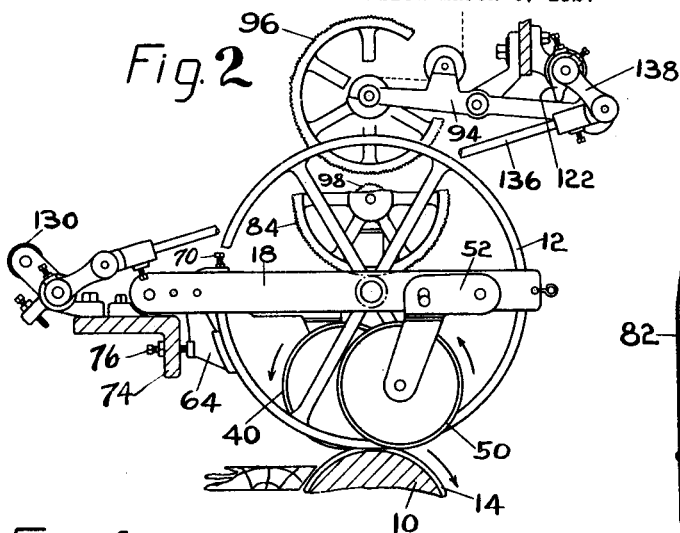
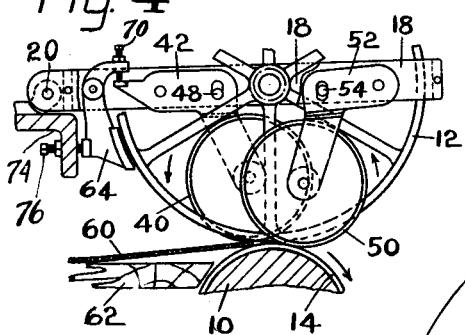
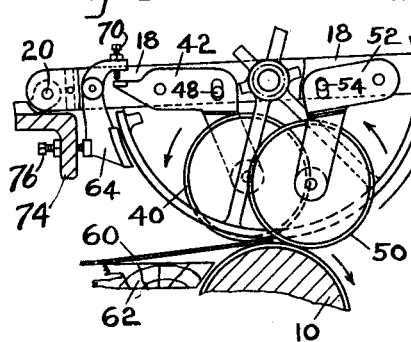
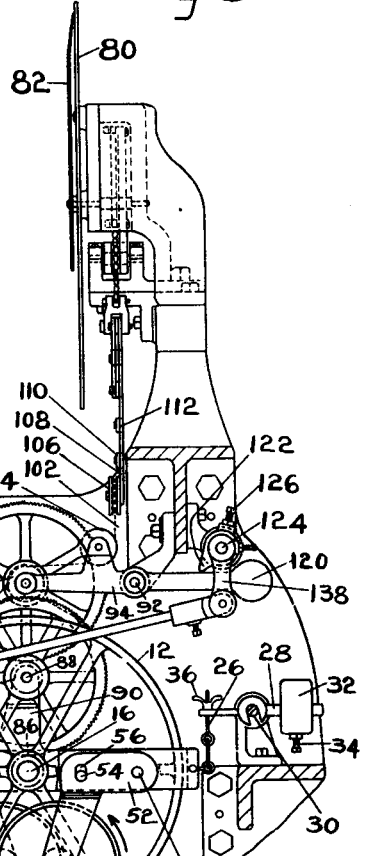
Inventor
Lyndon Oak Ramsdell
By his Attorney
Nelson H. Howard Patented Feb. 7, 1928.

1,658,351

UNITED STATES PATENT OFFICE.

LYNDON OAK RAMSDELL, OF PEABODY, MASSACHUSETTS, ASSIGNOR TO THE TURNER TANNING MACHINERY COMPANY, OF PORTLAND, MAINE, A CORPORATION OF MAINE.

MEASURING MACHINE.

Application filed March 5, 1927. Serial No. 173,061.

This invention relates to measuring machines and is illustrated as embodied in a machine for measuring the surface area of hides, skins, leather and other similar pieces of work.

It is a disadvantage of certain area measuring machines of the type wherein operation of a measuring member is initiated by the entering edge of the work, and notably in machines of the Sawyer type shown, for instance, in United States Letters Patent No. 931,144, granted Aug. 17, 1909, to The Peabody Leather Machinery Company as my assignee, wherein pieces of work are measured by measuring wheels located above a bed roll adapted to feed the work through the machine, that the measuring wheels or other work-measuring members must be adjusted with respect to the bed roll or other work support to accommodate pieces of work of different average thickness in order to obtain reasonably correct measurement of the work. In case adjustment is not made by the operator, in changing from one lot of work to another of a substantially different average thickness, there results a substantial error in the measurement indicated by the recording means. Since the necessary adjustment requires time and effort on the part of the operator it is all too seldom made. Hence, these machines record in many cases an actual excess of measurement over the true measurement of the pieces of work. The reason for this error resides in the fact that, in an unadjusted Sawyer type of machine, for example, a thicker piece of work upon entering and leaving the space between the measuring wheels and the bed roll contacts with one or more of the measuring wheels at a greater distance from the plane of lines joining the axes of each of the measuring wheels and the axis of the bed roll than a thinner piece of work. Hence, the thicker piece of work starts rotation of the measuring wheel or wheels sooner and maintains it later than the thinner piece of work. In other words, the thicker piece of work effects rotation of a measuring wheel for a longer time than a thinner piece of work of the same surface dimensions and hence is recorded as having an area greater than its real area.

It is an object of this invention to overcome the objections noted in connection with certain prior machines and particularly with those of the Sawyer type without sacrificing any of the numerous advantages of these types of measuring machines.

To this end and in accordance with important features of the invention there is provided improved means for preventing measuring movement of any measuring member until the forward edge of the entering piece of work has reached a predetermined point with respect to the surface of the measuring member, and further for preventing this measuring movement after the rear end of the same piece of work has passed beyond the said predetermined point. In this way each measuring member records exactly the distance between a point on the forward edge of the piece of work and a point on the rear edge of the same piece of work, irrespective of the thickness of the pieces of work. Conveniently, there is provided for each measuring member a member constructed and arranged to contact with the entering edge of the work and to lift the corresponding measuring member away from the work until the latter reaches the described predetermined point, means being provided for controlling the measuring member to prevent measuring movement of the measuring member after the work passes beyond said predetermined point. Preferably, and as shown, the lifting member is a wheel arranged to drop off the rear end of the work so as to operate a brake for the measuring member to stop the measuring movement of the measuring member just as it reaches the end of the work. For rendering the brake more certain in its operation, there is provided, in connection with each measuring member, means for supporting the measuring member to take all or the greater part of the weight thereof from the work while the rear edge of the latter is passing away from the plane defined by lines joining the axes of the measuring members and the axis of the bed roll. Since a measuring member under these circumstances is pressing lightly, if at all, upon the work, it is clear that the operation of the brake is facilitated so that it may serve, in the manner desired, positively to stop rotation of its associated measuring member upon the instant of its application. Preferably and as shown, the described supporting means is a wheel having a lost motion connected with its associated measuring member so that the latter may be entirely free to perform its measuring operations until the proper time comes for the wheel to operate as a supporting means for the measuring member.

In order to insure in a positive manner that no measuring movement of any measuring member will take place in the absence of a piece of work, each of the illustrated measuring members is so mounted that it rests normally against its brake, the construction and arrangement being such that it is released from the brake through the operation of the lifting wheel which rides up on the entering end of the work, so that this lifting wheel not only lifts the measuring member initially away from the work but also releases it from the brake so that it may begin its measuring operation freely as soon as the forward end of the work reaches the predetermined point already mentioned.

These and other important features of the invention will be described in detail in the specification and pointed out in the appended claims.

In the drawings,

Fig. 1 is a view in front elevation of a measuring machine illustrating one embodiment of the invention;

Fig. 2 is a side elevation of one of the measuring units shown in front elevation in Fig. 1;

Fig. 3 is an enlarged detail view partly in section taken along the line I—I in Fig. 1;

Fig. 4 is a detail view illustrating the operation and positioning of the lifting wheel and of the supporting wheel with relation to the corresponding measuring wheel during the entrance of the forward end of the work;

Fig. 5 is a similar view illustrating the same parts at the very beginning of the measuring operation;

Fig. 6 is a view similar to Figs. 4 and 5 illustrating the relative positions of the measuring wheel and its lifting and supporting wheels while the work is being measured;

Fig. 7 is a view similar to Figs. 4, 5 and 6 illustrating the setting of the brake for the measuring wheel; and Fig. 8 is a view similar to Figs. 4, 5, 6 and 7 and illustrating the position of the lifting and supporting wheels as the rear end of the work passes from contact with the measuring wheel.

In the illustrated machine, which is of the type referred to in the above mentioned Letters Patent, there is provided a bed roll 10 for feeding a piece of work and for supporting it for measurement by measuring wheels 12, the bed roll 10 being circumferentially grooved, as at 14, to receive a peripheral portion of a measuring wheel 12 located in the same plane with the groove. It will be observed upon inspection of Fig. 1 that many measuring wheels 12 are employed and that they are located in side by side relationship extending in a row across the machine and that a groove 14 is provided in the bed roll 10 for the reception of a peripheral portion of each measuring wheel. Since the arrangement for mounting and operating each measuring wheel is like that employed in connection with every other measuring wheel in the machine, a description of one will suffice for all. Referring particularly to Fig. 3 of the drawings, it will be observed that the measuring wheel 12 therein illustrated is supported by a pivot 16 for rotation upon a lever 18 pivoted at 20 to a bracket 22 carried by a cross bar 24 of the machine frame. At its other end the lever 18 is supported by a pair of links 26, the upper one of which passes through a lever 28 pivoted upon a rod 30 and carrying at its free end a weight 32 adjustably secured thereto by a set screw 34. As shown, the upper end of the upper link of the pair of links 26 is provided with a wing nut 36 screw threaded upon the end of the link so that the lever 18 may be supported in such a position that the wheel 12, while resting with a portion of its periphery within the groove 14, does not contact with the bed roll 10. Hence, the measuring wheel 12 is not driven by the bed roll 10 when no work is present between them. It will be understood that proper adjustment of the lever 18 is secured by proper adjustment of both the wing nut 36 and the weight 32 upon the lever 28. When a piece of work passes over the bed roll 10 it will support the measuring wheel 12, and the latter will be rotated as long as the work is passing between it and the bed roll.

In order to insure that the given measuring wheel will not start to measure the work before the front edge of the latter reaches a predetermined point with respect to the measuring wheel, that is, a point on the wheel in a line connecting the axes of the measuring wheel and the bed roll, there is provided for each measuring wheel a wheel 40 which has the function of lifting and supporting the measuring wheel 12 until the forward end of the work reaches the said line. As shown, each supporting wheel 40 is carried for rotation by a lever 42 pivotally supported at 44 upon the lever 18 and having a slot 46 through which extends a pin 48 secured to the lever 18. For supporting each measuring wheel 12 as the rear end of the piece of work is leaving the measuring wheel 12 there is provided a wheel 50 similar in all respects to the corresponding wheel 40 and similarly mounted, that is, upon a lever 52 carried by the lever 18 and having a pin and slot connection similar to the pin and slot connection 46, 48 for the lever 42, the pin and slot connection for the lever 52 being designated by reference characters 54, 56, respectively. Further, the lever 52 is mounted for rocking movement upon a pin 58 carried by the lever 18.

Upon inspection of Fig. 3 it will be observed that the lifting and the supporting wheel 40 and 50, respectively, are in contact with the bed roll 10 and that the pins 48 and 54 fixed to the lever 18 are at the bottom of their respective slots 46 and 56 so that any upward movement of either wheel 40 and 50 would result in lifting the measuring wheel 12. The links 26 at the forward end of the supporting lever 18 are adjusted so as to support the measuring wheel 12 within the slot 14, the peripheral portion of the wheel 12 being supported from contacting with the bottom of the slot. Hence, the wheel 12 is at rest with no tendency to rotate since it is not contacting with the constantly rotating bed roll 10. If a piece of work 60 be shoved along the supporting table 62 until it engages between the bed roll 10 and the lifting wheel 40, as indicated in Fig. 4, the said wheel 40 is lifted from the surface of the bed roll 10 and at the same time lifts the lever 18 and the measuring wheel 12 pivoted thereto. Since the periphery of the lifting wheel 40 is normally below the periphery of the measuring wheel 12, the latter does not contact with the work until the forward end of the work reaches a point in a line joining the axes of the measuring wheel and the bed roll, this position of the work being shown in Fig. 5 of the drawings. In the construction shown, the point thus predetermined coincides with the lowest point in the periphery of the measuring roll. Continued rotation of the bed roll 10 results in the rotation of the measuring wheel 12 (Fig. 6) and the measuring wheel continues in rotation until the rear end of the work is passing from the line already mentioned as joining the axes of the measuring wheel and the bed roll. (See Figs. 7 and 8.) At this time, that is, between the positions of the work shown in Figs. 7 and 8, the supporting wheel 50 comes into operation to take, at first, part of and subsequently all of the weight of the measuring wheel 12 away from the work. Since the periphery of the wheel 50 is struck about a shorter radius than that of the measuring wheel and is positioned to project beyond and below the periphery of the measuring wheel, it serves to support the measuring wheel out of contact with the work during part of the travel of the work from the position shown in Fig. 7 to that indicated in Fig. 8 of the drawings. To recapitulate, the wheel 40 serves to support the measuring wheel out of contact with the work as the latter is entering for a measuring operation while the wheel 50 operates to take part or all of the weight of the work as the latter is leaving after having passed the line joining the axes of the measuring wheel and bed roll. By this arrangement it is possible to obtain more accurate surface measurement of the work, irrespective of its thickness, than in prior constructions.

It will be observed that, when the given measuring wheel 12 is supported by the work, the wheels 40 and 50 rotate as idlers and have no supporting function, this being clearly disclosed in Fig. 6 of the drawings wherein the pins 48 and 54 are shown to occupy a position about midway of the length of their respective slots 46 and 56. However, it is to be understood that the piece of work 60 is not supporting all of the weight of the wheel 12, the lever 18 and other parts connected thereto, but that the weight of these parts is nearly counterbalanced by the weight 32 adjustable upon the end of the lever 28. This weight is adjusted so that there is just sufficient pressure exerted upon the work 60 by the measuring wheel 12 to insure proper traction for the latter.

Means is provided in the illustrated machine for stopping in a positive manner rotation of each measuring wheel 12 as the latter reaches the extreme rear edge of the passing piece of work. At the instant that the rear edge of the piece of work reaches the line joining the axis of a measuring wheel and the axis of the bed roll it is time to stop further rotation of that measuring wheel. Since the lifting wheel 40 may conveniently be arranged to drop off the rear edge of the work when it reaches the line mentioned, it is made use of to control the application of a brake or other similar means arranged to serve as a stopping means for the measuring wheel. As shown, the stopping or braking means is embodied in a braking member 64, one for each measuring wheel 12, pivoted at 66 on the lever 18 of each measuring wheel and having a relatively broad surface at 68 for contact with the periphery of its associated measuring wheel 12. The upper arm of each member 64 beyond the pivot 66 is provided with a set screw 70 which may be adjusted and then locked in proper position by a nut lock 72. Projecting through a flange 74 of the supporting cross bar 24 is a second adjustable stop 76 which may be similarly locked in adjusted position. Upon reference to Figs. 3, 4 and 7 it will be observed that each brake member 64 is controlled in its initial application to the corresponding measuring wheel 12 by the associated supporting wheel 40. When no work is in place above the bed roll 10 the measuring wheel 12 rests against the brake 64. As soon, however, as a piece of work enters between the supporting wheel 40 and the bed roll 10 the wheel 12 is lifted away from the brake and is thus freed to rotate before the work reaches the point of contact with the measuring wheel at the line joining the axes of the measuring wheel and the bed roll. Moreover all of the time that the measuring wheel is running on the work it is out of contact with the brake 64. As soon, however, as the supporting wheel 40 runs off of the rear end of the work, as illustrated in Fig. 7 the brake is applied to stop the wheel 12, though the latter is still in raised position, being supported therein by the work and by the supporting wheel 50, as indicated in Fig. 7. In this figure it is seen that the brake is applied by the operation of the lever 42 which has its rear end extending under the set screw 70 in a position to contact therewith as soon as the supporting wheel drops from the work. In this way the measuring wheel is stopped at the very instant that its measuring function should cease. For this reason the wheel 40 is so dimensioned and so arranged that it drops off the rear edge of the work as the latter reaches the line joining the centers of the measuring wheel 12 and bed roll 10. As before stated, the measuring wheel 12 is still contacting with the work when the lifting wheel 40 drops off the work to set the brake 64. It follows that the work must be dragged away from the braked wheel 12. This is readily accomplished without any interruption in the feeding of the work, this fact being due to a number of reasons. Firstly, the wheels 40 associated with the measuring wheels 12, do not drop off the rear edge of the work simultaneously but individually or in groups of two or three or four because of the irregularity of the contour of the rear edge of the work. Hence, while some wheels are temporarily dragging on the work by reason of their being locked against rotation by the brake 64 other measuring wheels 12 are still rotating and assisting in the feeding of the work. However, even if a majority or all of the wheels 40 should drop off the rear edge of the work, thus setting the brakes upon the greater number or all of the measuring wheels, the work would still be fed due to the movement of the power driven bed roll 10 and to the weight of the work and to its momentum in the direction of feeding movement. The most important factor, however, in insuring both effective operation of the brake 64 and of the feeding of the work after the setting of the brake resides in the provision of the wheels 50, one for each measuring wheel 12, which take the weight of each measuring wheel very shortly after the rear edge of the work passes the plane defined by the lines which join the axes of the measuring wheels and the axis of the bed roll, so that there is only an instant when any considerable pressure is exerted by the individual measuring wheel after its associated lifting wheel 40 drops off the work. When the work has passed by the supporting wheel 50, the measuring wheel 12 is allowed to descend to its lowest position and thus puts its weight upon the braking surface at 68, thus insuring against movement of the wheel 12 when no work is being measured. It is to be understood that the wheel 12 rests against the brake 64 with considerable pressure when the wheel is in its lowermost position and that the counterbalancing of the wheel by means of the weight 32 is not so great as it is later when the wheel 12 has been raised by wheel 40 to the level of the surface of the work.

For transmitting the movement of each measuring wheel 12 to an indicator mechanism comprising a dial 80 and pointer 82 there is provided a toothed wheel 84 which is constantly in mesh with a pinion 86 secured to the hub of the measuring wheel 12, the toothed wheel 84 being rotatably supported at 88 upon an arm 90 extending upwardly from the lever 18. Hence the wheel 84 and the pinion 86 remain constantly in mesh with each other. Mounted upon a pivot 92 is a lever 94 which carries at one end for rotation thereon a toothed wheel 96 which is arranged to mesh with a pinion 98 secured to the hub of the toothed wheel 84. Conveniently, and as shown, a hub member 100 on the toothed wheel 96 has secured thereto and partially wrapped around it a cable or chain 102 which, after passing around an idler roll 104, is passed over a pulley 106 suspended by a link 108 pivoted to a lever 110 which is in turn pivotally supported from another lever 112. This lever is in turn, pivotally supported by other levers composing parts of a system of levers most clearly shown in Fig. 1 of the drawings, the final lever 114 being pivoted at 116 upon the frame of the machine and having a connection to operate the pointer 82. The description of the system of totalizing levers and of their connection with the indicating mechanism is given thus briefly in view of the fact that the illustrated embodiment of such totalizing mechanism and of the indicating mechanism is old and well known, as shown, for instance, in the Letters Patent already referred to. Referring again to Figs. 2 and 3 of the drawings, it will be observed that the lever 94 which supports the toothed wheel 96, is provided with a weighted end 120 to counterbalance, in part, the weight of the toothed wheel 96 so that movement of the lever into meshing relation with the pinion 98, will not be accomplished so abruptly as to damage the teeth on either the pinion or the toothed wheel. For moving the toothed wheel 96 out of mesh with the pinion 98 there is provided a cam member 122 adjustably secured to a shaft 125 by means of a set screw 126, the cam 122 being adapted to contact with the upper surface of the lever 94 at a point adjacent to the weighted end 120 to depress the latter end, thus lifting the wheel 96 from the pinion 98. It will be understood that each of the toothed wheels co-operating with its associated measuring wheel 12 is mounted similarly to the toothed wheel 96 shown in Figs. 2 and 3, and that a similar cam 122 is provided in connection with each lever 94 to operate the lever so that all of the toothed wheels 96 may be simultaneously lifted. When this occurs the system of levers comprising the totalizing mechanism, the indicator operating mechanism and the toothed wheels 96 are all returned to initial position through the operation of the weighted lever 114 as described in connection with a similarly operated mechanism in Patent No. 931,144 already referred to. For operating the shaft 124 there is provided in the construction shown a handle 130 at the front of the machine which may be manually depressed by the operator to cause tripping of the totalizing and indicating mechanisms. As shown, this handle 130 is mounted upon a shaft 132 supported in brackets at the front of the machine and having secured thereto at its opposite end a link 134 to which is pivotally secured at its free end a rod 136 which is in turn pivotally secured to a link 138 fixedly but adjustably attached to the shaft 124. Upon raising the handle 130 to the position shown in Fig. 2 the cams 122 are rocked to cause lifting of the toothed wheels 96, whereupon the wheels, the totalizing mechanism and the indicating means are all returned to initial position.

In operating with the machine shown in the drawings a piece of work 60, such as a hide or skin, is shoved over the work support 62 until its forward end engages with one or more of the lifting wheels 40. When this occurs feeding of the work begins since the work is gripped between the wheel or wheels 40 and the power driven bed roll 10. Since the lifting wheels 40 take the weight of the measuring wheels 12, the entering portion of the work is firmly pressed against the bed roll 10 to secure traction sufficient for the feeding of the work. Finally when the entering edge of the work reaches the line joining the axes of a given measuring wheel and the bed roll, that measuring wheel begins its rotation thus serving as a measuring member and at the same time as part of the feeding means in co-operation with the bed roll 10. When the rear edge portion of the piece of work reaches the described line, the lifting wheel 40 drops off this rear edge and instantly sets the brake 64 to stop its associated measuring wheel. At the instant that this occurs the measuring wheel 12 is still in engagement with the work but its weight is taken in part by the supporting wheel 50 which very promptly assumes all of the weight of its associated measuring wheel, thus facilitating the action of the brake 64 which operates positively to hold the wheel 12 against rotation from the instant that the lifting wheel 40 dropped off the rear edge of the work. In this way an accurate measurement of the piece of work is obtained since each measuring wheel begins to rotate only when the forward edge of the piece of work has reached the described line and stops its rotation when the rear edge of the work reaches the same line.

Having described my invention, what I claim as new and desire to secure by Letters Patent of the United States is:

1. In a measuring machine, a support over which a piece of work is passed during measuring operations, a measuring member adapted to be operated by the work as it passes over the support for performing a measuring operation, a member operative to prevent measuring movement of the measuring member until the latter reaches a predetermined point with relation to such measuring member, and a member operative to prevent measuring movement of the measuring member as soon as the rear end of the piece of work passes away from the predetermined point already mentioned.

2. In a measuring machine, a support over which a piece of work is passed during measuring operations, a measuring member adapted to be operated by the work as it passes over the support for performing a measuring operation, a member for lifting the measuring member and preventing operation thereof by the work until the latter reaches a predetermined point with relation to such measuring member, and a supporting member operative to maintain the measuring member in raised inoperative relation to the work while the rear end of the piece of work passes away from the predetermined point already mentioned.

3. In a measuring machine, a support for a piece of work undergoing measuring operations, a measuring wheel adapted to be operated by the piece of work for performing a measuring operation thereon, a memher constructed and arranged to contact with the work as the latter is entering beneath the wheel to lift the wheel out of contact with the work until the latter reaches a predetermined point with relation to the wheel, and a second member operative to keep the measuring wheel in raised inoperative relation to the work while the rear end of the piece of work passes away from the predetermined point already mentioned.

4. In a machine for measuring the surface area of hides, skins, leather and other similar pieces of work, a support for a piece of work undergoing measuring operations, a measuring wheel adapted to be operated by the piece of work for performing a measuring operation thereon, a wheel arranged to contact with the work as the latter is entering beneath the wheel and constructed and arranged to lift the measuring wheel out of contact with the work until the latter reaches a predetermined point with relation to the wheel, and a brake for the measuring wheel adapted to be set in braking relation to the measuring wheel by the said lifting wheel as it drops off the rear end of the piece of work.

5. In a machine for measuring the surface area of hides, skins, leather and other similar pieces of work, a support for a piece of work undergoing measuring operations, a measuring wheel adapted to be operated by the piece of work for performing a measuring operation thereon, a member arranged to contact with the work as the latter is entering beneath the wheel and constructed and arranged to lift the measuring wheel out of contact with the work until the latter reaches a predetermined point with relation to the wheel, and a brake for the measuring wheel adapted to be set in braking relation to the measuring wheel by the said member as it drops off the rear end of the piece of work.

6. In a machine for measuring the surface area of hides, skins, leather and other similar pieces of work, a support for a piece of work undergoing measuring operations, a measuring wheel adapted to be operated by the piece of work for performing a measuring operation thereon, a member arranged to contact with the work as the latter is entering beneath the wheel and constructed and arranged to lift the measuring wheel out of contact with the work until the latter reaches a predetermined point with relation to the wheel, and a braking means for the measuring wheel adapted to be set in braking relation to said wheel when the rear edge of the piece of work reaches a predetermined point in relation to said wheel.

7. In a machine for measuring the surface area of hides, skins, leather and other similar pieces of work, a support for a piece of work undergoing measuring operations, a measuring wheel adapted to be operated by the piece of work for performing a measuring operation thereon, a member arranged to contact with the work as the latter is entering beneath the wheel and constructed and arranged to lift the wheel out of contact with the work until the latter reaches a predetermined point with relation to the wheel, a brake for the measuring wheel adapted to be set in braking relation to the measuring wheel by the said member, and a second member operative to keep the measuring wheel in raised in operative position relatively to the support and in co-operation with the brake to prevent rotation of the measuring wheel after the rear end of the piece of work passes beyond said predetermined point.

8. In a machine for measuring the surface area of hides, skins, leather and other similar pieces of work, a support over which a piece of work is passed during measuring operations, a measuring wheel adapted to be operated by the piece of work for performing a measuring operation thereon, a member for supporting the measuring wheel out of contact with the work support, a member adapted to contact with the forward edge of an entering piece of work and connected to lift the supporting member and the measuring wheel so that the work does not contact with the measuring wheel until a predetermined point is reached, and a second member connected to the support for the measuring wheel and adapted to keep the measuring wheel and its support in raised inoperative position after the rear end of the work passes away from the predetermined point already mentioned.

9. In a machine for measuring the surface area of hides, skins, leather and other similar pieces of work, a support over which a piece of work is passed during measuring operations, a measuring wheel adapted to be operated by the piece of work for performing a measuring operation thereon, a supporting member for the measuring wheel, a lifting wheel connected to said supporting member for contacting with the forward end of the work as the latter is entering beneath the measuring wheel to lift the latter away from the entering end of the piece of work, and a brake for the measuring wheel arranged to be set by the lifting wheel as it drops off the rear edge of the work.

10. In a machine for measuring the surface area of hides, skins, leather and other similar pieces of work, a support over which a piece of work is passed during measuring operations, a measuring wheel adapted to be operated by the piece of work for performing a measuring operation thereon, a supporting member for the measuring wheel, a lifting wheel connected to the supporting member and arranged to lift the supporting member and the measuring wheel while the forward end of the piece of work is entering beneath the measuring wheel and until it reaches a predetermined point with respect to the measuring wheel, and a second lifting wheel connected to the supporting member and arranged to keep the measuring wheel in raised inoperative position after the rear end of the piece of work passes beyond said predetermined point.

11. In a machine for measuring the surface area of hides, skins, leather and other similar pieces of work, a support over which a piece of work is passed during measuring operations, a measuring wheel adapted to be operated by the piece of work for performing a measuring operation thereon, a supporting member for the measuring wheel, a lifting wheel for contacting with the forward end of the work as the latter is entering beneath the measuring wheel to lift the latter from the entering end of the piece of work, a lever pivoted to the supporting member for carrying the lifting wheel, a pin and slot connection between the lever and the supporting member constructed and arranged so that the lifting wheel is effective to lift the supporting member and the measuring wheel during the entrance of the work and so that the lifting wheel may drop off the rear end of the work while the measuring wheel remains in raised position, and a brake for the measuring wheel arranged to be set by the lifting wheel as it drops off the rear edge of the work.

12. In a machine for measuring the surface area of hides, skins, leather and other similar pieces of work, a support over which a piece of work is passed during measuring operations, a measuring wheel adapted to be operated by the piece of work for performing a measuring operation thereon, a supporting member for the measuring wheel, a lifting wheel for contacting with the forward edge of a piece of work to lift the measuring wheel to prevent its contacting with the work until the forward edge of the work reaches the lowest point in the periphery of the measuring wheel, a second wheel operative to maintain the measuring wheel in raised inoperative position after the rear edge portion of the piece of work passes away from the said point, and a lost-motion connection between the two last-recited wheels and the supporting member whereby the measuring wheel is permitted to contact with the work with the other two wheels running idly on the work in unsupporting relation to the measuring wheel during measurement of the work.

13. In a machine for measuring the surface area of hides, skins, leather and other similar pieces of work, a support over which a piece of work is passed during measuring operations, a measuring wheel adapted to be operated by the piece of work for performing a measuring operation thereon, a lifting wheel connected to lift the measuring wheel away from the entering edge of the work until the latter reaches a predetermined point with relation to the measuring wheel, and a brake for the measuring wheel, said measuring wheel being normally supported in the absence of a piece of work with the measuring wheel resting against the brake.

14. In a machine for measuring the surface area of hides, skins, leather and other similar pieces of work, a support over which a piece of work is passed during measuring operations, a measuring wheel adapted to be operated by the piece of work for performing a measuring operation thereon, a supporting member for the measuring wheel, a lifting wheel connected to the supporting member and adapted to lift the measuring wheel away from the entering edge of the work until the latter reaches a predetermined point with relation to the measuring wheel, and a brake for the measuring wheel adapted to be operated into braking position when the lifting wheel runs off the rear edge of the work, said supporting member and measuring wheel being normally supported in the absence of a piece of work with the measuring wheel resting against the brake.

15. In a machine for measuring the surface area of hides, skins, leather and other similar pieces of work, a support over which a piece of work is passed during measuring operations, a measuring wheel adapted to be operated by the piece of work for performing a measuring operation thereon, a supporting member for the measuring wheel, a lifting wheel connected to the supporting member and adapted to lift the measuring wheel away from the entering edge of the work until the latter reaches a predetermined point with relation to the measuring wheel, a lost-motion connection between the lifting wheel and the supporting member, and a brake for the measuring wheel adapted to be operated into braking position when the lifting wheel runs off the rear edge of the work, said supporting member and measuring wheel being normally supported in the absence of a piece of work with the measuring wheel resting against the brake.

16. In a machine for measuring the surface area of hides, skins, leather and other similar pieces of work, a support over which a piece of work is passed during measuring operations, a measuring wheel adapted to be operated by the piece of work for performing a measuring operation thereon, a brake for the measuring wheel, the measuring wheel being positioned normally to rest against the brake whereby accidental rotation of the measuring wheel is prevented, and a lifting member connected to lift the measuring wheel away from the brake when the forward edge of a piece of work is introduced between the lifting member and the work support, said lifting member having a lost motion connection with the measuring wheel so that it is free to drop off the rear end of the work and set the brake positively to stop rotation of the measuring wheel when the rear edge of the piece of work is reached.

17. In a machine for measuring the surface area of hides, skins, leather and other similar pieces of work, a support over which a piece of work is passed during measuring operations, a measuring wheel adapted to be operated by the piece of work for performing a measuring operation thereon, a supporting member for the measuring wheel, a brake for the measuring wheel, the measuring wheel and supporting member being so positioned that the measuring wheel normally rests against the brake whereby accidental rotation of the measuring wheel is prevented, a lifting wheel connected to the supporting member and adapted to lift the measuring wheel away from the brake when the forward edge of a piece of work is introduced between the lifting wheel and the work support, and a lost-motion connection between the lifting wheel and the supporting member so that the lifting wheel is free to drop off the rear end of the work and set the brake positively to prevent further rotation of the measuring wheel when the rear end of the piece of work is reached.

18. In a machine for measuring the surface area of hides, skins, leather and other similar pieces of work, a bed roll for supporting a piece of work and feeding the same during the measuring operation, said bed roll having a circumferential slot therein, a measuring wheel having a peripheral portion adapted to project into said slot in the absence of work and adapted to be rotated by the work passing over the bed roll, a wheel for lifting the measuring wheel out of said slot and maintaining it out of contact with the entering edge of the work until the latter reaches a line joining the axes of the measuring wheel and the bed roll, and a second wheel adapted to support the measuring wheel out of contact with the rear end portion of the work after the latter portion passes beyond the said line so that the measuring wheel measures the work from the time its front edge reaches the line until its rear edge leaves the said line.

19. In a machine for measuring the surface area of hides, skins, leather and other similar pieces of work, a roller support for a piece of work, a measuring wheel above the support arranged to be rotated in contact with the work for a measuring operation on the latter, a movable member for supporting the measuring wheel, and a pair of wheels connected to said movable member for supporting the measuring wheel out of contact with the work while it is moving toward a line joining the axes of the roller support and the measuring wheel and for maintaining the measuring wheel in raised inoperative position after the rear end of the work has passed said line, said supporting wheels being spaced from each other in the direction of feeding movement of the work.

20. In a machine for measuring the surface area of hides, skins, leather and other similar pieces of work, a measuring wheel adapted to be rotated by a piece of work in measuring operations, a pair of wheels operative respectively to support the measuring wheel out of contact with the work until the latter reaches a predetermined point relative to the measuring wheel and to maintain the measuring wheel in raised inoperative position after the rear edge of the work has passed said point, and lost motion connections between the measuring wheel and the other two wheels so that the latter become idlers while the measuring wheel rests on the work.

21. In a measuring machine, a measuring wheel, a pair of wheels for supporting the measuring wheel in inoperative relation with respect to the work while the front end of the work is moving to contact with the measuring wheel at a predetermined point in the periphery thereof and after the rear end of the work has passed said point, and a brake for the measuring wheel arranged to be controlled by one of the supporting wheels.

22. In a measuring machine, a measuring wheel, a pair of movable wheels for supporting the measuring wheel in inoperative relation with respect to the work while the front end of the work is moving to contact with the measuring wheel at a predetermined point in the periphery thereof and after the rear end of the work has passed said point, and a brake for the measuring wheel arranged to be controlled in timed relation to the movement of the supporting wheels.

23. In a measuring machine, a bed roll for supporting and feeding the work, a measuring wheel adapted to be rotated by a piece of work for measuring operations thereon, a wheel arranged to support the measuring wheel out of contact with the work until the work has reached a line connecting the axes of the measuring wheel and bed roll, and a brake controlled by the supporting wheel so as to release the measuring wheel at the beginning of measuring operations and to brake the measuring wheel as soon as the rear edge of the piece of work has passed the said line.

24. In a machine for measuring the surface area of hides, skins, leather and other similar pieces of work, a power driven bed roll for supporting a piece of work and feeding it through the field of measuring operations, a measuring wheel above the bed roll, a movable member for supporting the measuring wheel, a wheel of a lesser radius than that of the measuring wheel connected to the movable supporting member for supporting the measuring wheel out of contact with the work during entrance of the latter and until it reaches a line joining the axes of the measuring wheel and the bed roll, and a brake for the measuring wheel arranged to be controlled by the supporting wheel.

In testimony whereof I have signed my name to this specification.

LYNDON OAK RAMSDELL.